United States Patent

Bruun

[11] Patent Number: 5,540,252
[45] Date of Patent: Jul. 30, 1996

[54] PNEUMATICALLY STABILIZED INLINE VALVE

[75] Inventor: Eugene R. Bruun, Simsbury, Conn.

[73] Assignee: United Technologies Corporation, Hartford, Conn.

[21] Appl. No.: 278,299

[22] Filed: Jul. 21, 1994

[51] Int. Cl.⁶ ..................................................... G05D 7/06
[52] U.S. Cl. .................. 137/220; 137/487.5; 137/505.14
[58] Field of Search ............................... 137/220, 505.14, 137/487.5

[56] References Cited

U.S. PATENT DOCUMENTS

| 3,119,405 | 1/1964 | Guy | 137/220 X |
| 3,155,108 | 11/1964 | Kahn et al. | 137/220 |
| 3,338,259 | 8/1967 | Tribe | 137/220 |
| 3,865,128 | 2/1975 | Zadoo | 137/220 |
| 4,316,597 | 2/1982 | Goodman et al. | 251/58 |
| 4,610,265 | 9/1986 | Nelson | 137/219 |
| 4,735,056 | 4/1988 | Goodman | 62/172 |
| 5,155,991 | 10/1992 | Bruun | 60/39.07 |

Primary Examiner—Gerald A. Michalsky

[57] ABSTRACT

A variable area inline valve receives a pressurized fluid and regulates the amount of pressurized fluid flowing through the valve. The valve includes a piston assembly which slides longitudinally along a center line of the valve to control a variable flow area through which the fluid passes to the outlet of the housing. To stabilize the valve, the valve includes an axial feedback passage through which outlet fluid enters and is fed back to a first cavity to provide a retarding force to the piston movement. This fluid feedback assembly allows a proportional amount of the outlet fluid pressure to act on the piston assembly and stabilize the valve by providing a positive spring rate to the valve (i.e., negative feedback). The size of both the feedback orifice and a vent orifice which vents the first cavity to ambient sets the gain of the feedback. The present invention provides a stable, controllable valve which can be used to regulate the amount of bleed air flow from a gas turbine engine to a aircraft thermal anti-ice system.

4 Claims, 3 Drawing Sheets

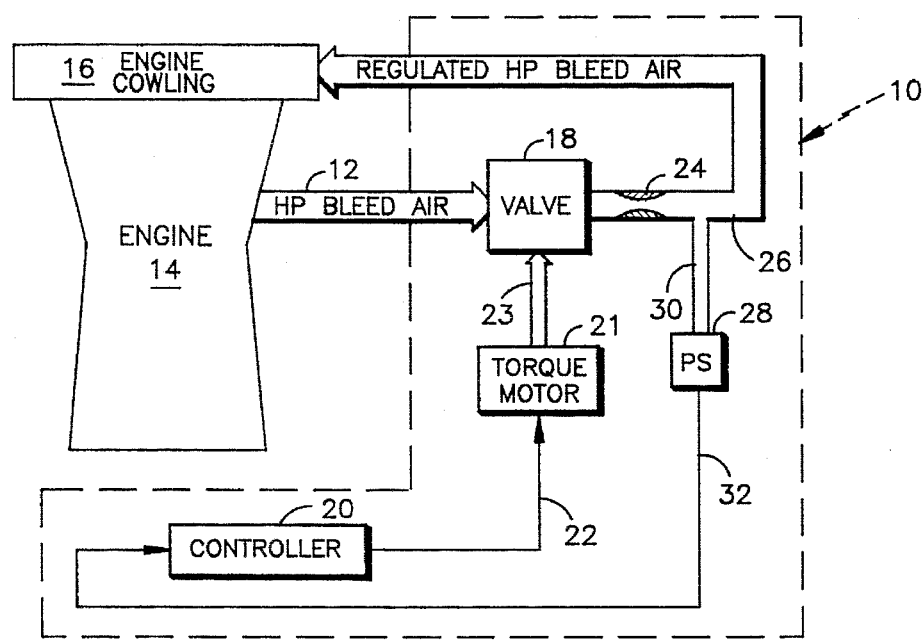
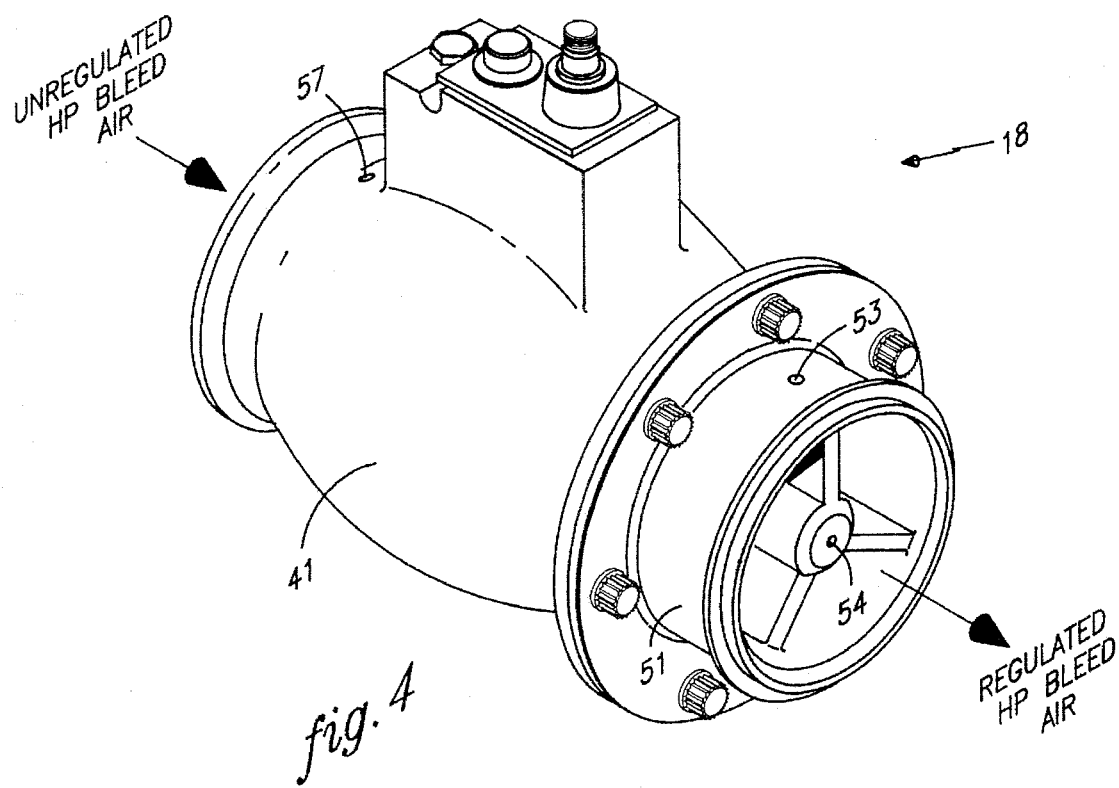

PNEUMATICALLY STABILIZED INLINE VALVE

TECHNICAL FIELD

This invention relates to a valve, and more particularly to an inline valve having pneumatic feedback.

BACKGROUND ART

As known, both commercial and military aircraft use bleed air from the aircraft's gas turbine engine to supply pneumatic and thermal energy to on board systems which provide aircraft air conditioning, cabin pressurization, thermal anti-ice (TAI), and engine thrust reversal.

The warm compressed bleed air supplied to the TAI system is used to de-ice and/or prevent the accumulation of ice on the leading edge of the engine cowlings and the leading edges of the aircraft wing. Since the bleed air taken from the engine to supply the TAI system is compressed air that can not be used for thrust, the TAI system should be designed to be as judicious as possible with respect to the amount of bleed air it takes from the engine. This often leads to aggressive designs and control systems to ensure that only the necessary amount of bleed air is taken, and therefore engine efficiency remains high which leads to reduced engine operating costs.

Since the TAI system should use a minimum amount of necessary bleed air to perform the anti-ice function, the operating line of the TAI control system must be aggressively designed in order to extract only the minimum amount of bleed air. While various regulating valve designs have been proposed for the TAI control system, for the most part, such valve designs have exhibited less than optimum control stability.

DISCLOSURE OF THE INVENTION

An object of the present invention is to provide a stable modulating inline valve which controls the mass of fluid flow through the valve.

Another object of the present invention is to provide an easily controlled, stable, variable flow area valve which controls the mass flow of bleed air to be used for an aircraft thermal anti-ice system.

According to the present invention, a variable area inline valve is used to control the mass flow of fluid, the valve includes a valve housing having an inlet which receives a pressurized fluid and within which a piston assembly is mounted and slides longitudinally along the center line of the valve to control a variable flow area through which the fluid passes to the outlet of the housing; to stabilize the valve, the valve includes an axial feedback passage through which outlet fluid enters and is fed back to the first cavity to provide a retarding force to the piston movement.

The axial feedback passage through the valve allows a proportional amount of the outlet fluid pressure to act on the piston assembly and stabilize the valve by providing a positive spring rate to the valve (i.e., negative feedback). The size of both the feedback orifice and a vent orifice which vents the first cavity to ambient sets the gain of the feedback. The present invention provides a stable, controllable valve which can be used to regulate the amount of bleed air flow from a gas turbine engine to a aircraft thermal anti-ice system. This pressure feedback ensures that the valve operates with a sufficient stability such that a TAI control system will extract only the necessary amount of bleed air from the engine for the TAI system.

These and other objects, features and advantages of the present invention will become more apparent in light of the following detailed description of a preferred embodiment thereof, as illustrated in the accompanying drawings.

BRIEF DESCRIPTION OF THE DRAWINGS

FIG. 1 is a functional illustration of a thermal anti-ice (TAI) system which receives bleed air from a gas turbine engine and regulates the amount of bleed air supplied to the engine cowling;

FIG. 4 is an illustration of the regulating valve.

BEST MODE FOR CARRYING OUT THE PRESENT INVENTION

Figure 2:
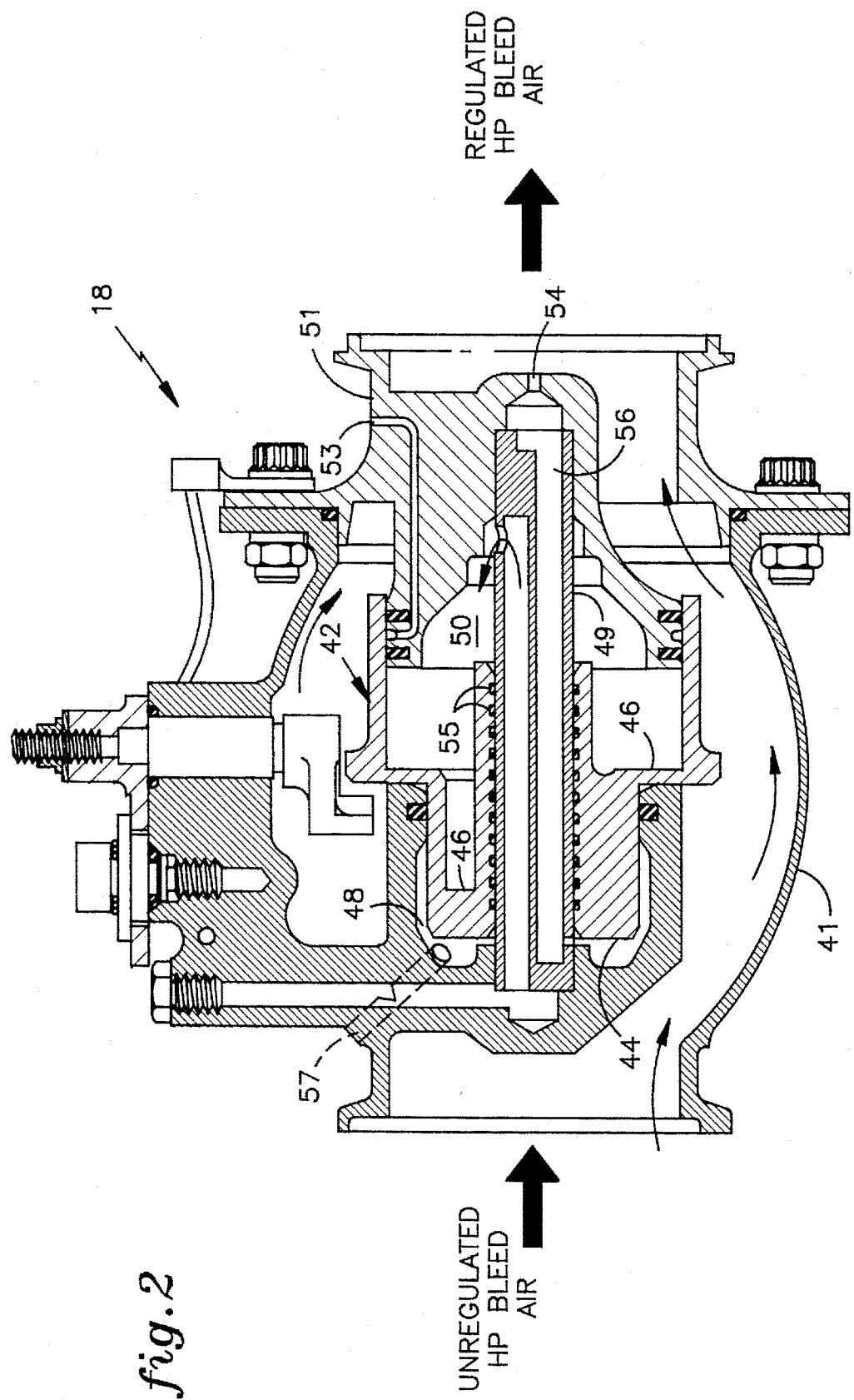
FIG. 2 illustrates a cross sectional view of the regulating valve in the full open position through which the bleed air flow is regulated to provide a regulated flow of bleed air.

FIG. 1 is a functional illustration of a thermal anti-ice (TAI) system 10 which receives high pressure (HP) bleed air via a conduit 12 from a gas turbine engine 14 and regulates the amount of bleed air supplied to the engine cowling 16. The TAI system 10 includes a regulating valve 18 having a variable flow area through which the bleed air passes. A controller 20 provides a valve area command signal on a line 22 to a torque motor 21 which sets the variable flow area, and therefore, the amount of bleed air flowing through the valve 18. The torque motor 21 provides pressurized air via a pneumatic conduit 23 to control the viable flow area of the valve. The system 10 also includes a venturi 24 mounted within an outlet conduit 26 which routes the regulated bleed air to the engine cowling 16. The venturi 24 acts as flow limiter to limit the flow through the outlet conduit 26 in the event the valve 18 fails in the full open position. The system 10 also includes a pressure sensor 28 which senses the static pressure of the regulated bleed air in the outlet conduit 26 via a non-flowing line 30. The pressure sensor 28 provides an electrical sensed signal on a line 32 to the controller 20. The controller 20 is preferably an electronic controller having a central processing unit (e.g., a microprocessor or microcontroller) which performs control logic computations to determine the command signal value on the line 22 based upon the operating conditions of the engine and the requirements of the TAI system. The controller schedules a desired pressure within the outlet conduit 26 and compares the desired pressure value to the actual pressure signal value on the line 32. The controller then acts to null the difference between the actual pressure signal value and the desired pressure value by controlling the variable flow area of the valve 18. If the variable flow area of the valve 18 increases, the pressure in the outlet conduit 26 increases. Similarly, if the variable flow area of the valve is decreased, the pressure in the outlet conduit 26 is decreased. The controller 20 schedules outlet conduit pressure rather than heat flux since heat flux and pressure are directly proportional, and pressure sensing is readily performed.

Figure 3:
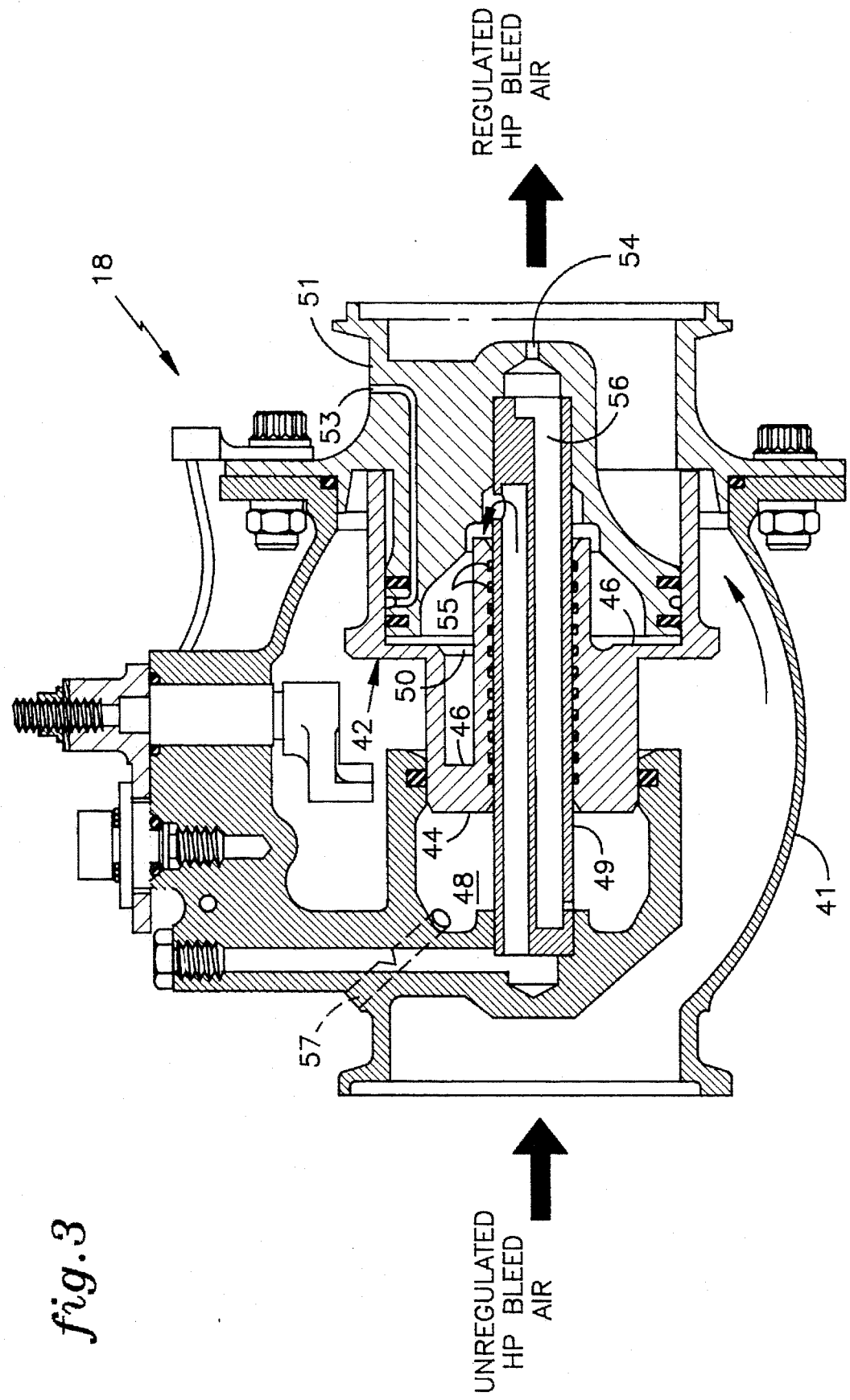
FIG. 3 illustrates a cross sectional view of the regulating valve in the full closed position.

FIG. 2 illustrates a cross sectional view of the regulating valve 18 through which the bleed air flow is regulated to provide a regulated flow of bleed air. The valve 18 is preferably an inline valve which receives the unregulated HP bleed air and regulates the flow of bleed air to provide a regulated amount of bleed air mass flow to the outlet conduit 26 (FIG. 1). The valve includes a housing 41 within which is an annular piston assembly 42 which moves longitudinally along a center line of the housing 41 as a function of the forces acting on a first and second face 44, 46 respectively of the piston 42. The forces acting on the first face 44 of the piston are a function of the pressure in a first cavity 48, while the forces acting on a second face 46 of the piston 42 are a function of the pressure in a servo pressure cavity 50. To increase the amount of fluid which flows through the valve 18, the variable flow area is increased by raising the pressure in the servo pressure cavity 50 which slides the annular piston 42 back towards the inlet side of the valve. Similarly, to decrease the variable flow area of the valve the pressure in the servo cavity 50 is reduced and the piston 42 slides towards the outlet side of the valve reducing the variable flow area. FIG. 2 illustrates the valve in the full open position while FIG. 3 illustrates a cross sectional view of the valve in the full closed position. The piston assembly 42 slides along seals 55 and a center shaft 49 of the housing to reduce the friction and hence the forces necessary to move the piston 42. The valve also includes an outlet flange assembly 51 which fastened (e.g., bolted) to the valve housing 41. The outlet flange assembly 51 includes a vent 53 to ambient which ensures the seating of the piston rings under all pressure conditions within the valve 18.

Referring to FIGS. 2 and 3, the valve 18 also includes a feedback orifice 54 which feeds back air at the outlet of the valve through a feedback passage 56 in the housing to the first cavity 48. This feedback pressure increases the pressure in the first cavity 48 and acts as a retarding force on the piston 42 while the piston is moving to increase the variable flow area of the valve. The ratio of the feedback orifice 54 diameter to the diameter of a vent orifice 57 determines what proportion of the outlet pressure in the outlet conduit 26 (FIG. 1) is fed back to the first cavity 48 to act on the first face 44 of the piston 42. The vent orifice 57 vents the first cavity 48 to ambient. If the size of the vent orifice 57 is decreased the amount of pressure feedback to the first cavity 48 increased. Similarly, if the size of the vent orifice 57 is increased the amount of feedback is decreased since more air is vented to ambient. FIG. 4 illustrates the regulating valve 18 and in particular the feedback orifice 54 and the vent orifice 57.

Although the present invention has been described with respect to a gas (e.g., air) as the medium being regulated by the valve, one of ordinary skill will appreciate the valve is also capable of regulating a liquid. The term fluid as used herein shall include both liquid and gas. In addition, although the valve has been described as having a housing, piston assembly and an outlet flange assembly, it is contemplated that the valve could be machined in several different ways. As an example, the valve could clearly be machined to be assembly of more than three separate components, or it may be machined to be a single piece or two pieces.

Notwithstanding the foregoing detailed description, and the various alternative embodiments discussed herein, simply stated the present invention is a valve having pressure feedback of the outlet fluid which acts on the piston assembly of the valve to enhance the stability and controllability of the valve. The feedback of the pressure in the outlet conduit 26 to the first cavity 48 acts as a stabilizing force against movement of the piston 42 which ensures the valve 18 operates with a positive spring rate (i.e., negative feedback) in both directions of piston movement.

I claim:

1. A stabilized inline valve responsive to a command signal and which provides a regulated fluid flow, comprising:

a housing having an inlet which receives a pressurized fluid, and an outlet which provides the regulated fluid flow;

a piston assembly mounted within said housing and which slides longitudinally as commanded by the command signal to control a variable flow area within said housing through which fluid flow passes to provide the regulated fluid flow, wherein the longitudinal movement of said piston is controlled by the pressure in a first cavity exerting force on a first face of said piston, versus the pressure in a servo pressure cavity exerting force on a second face of said piston;

a feedback passage formed within said housing which provides feedback of the regulated fluid pressure at the outlet of said housing to the first cavity, wherein the fed back fluid pressure exerts a pressure on said first face of the piston to exert a retarding force on the piston assembly to enhance the valve's stability;

an outlet flange assembly which connects to said housing, wherein the regulated fluid flow exits the valve through said outlet flange assembly and said outlet flange includes a feedback orifice through which the regulated fluid pressure is fed back into said feedback passage; and a vent orifice which vents said first cavity to ambient, wherein the ratio of the diameter of said vent orifice and the diameter of said feedback orifice controls the amount of pressure feedback to said first cavity.

2. A pneumatically stabilized inline valve responsive to a command signal and which provides a regulated fluid flow, comprising:

a housing having an inlet which receives a pressurized fluid, a longitudinal center shaft, and an outlet which provides the regulated fluid flow;

an annular piston assembly mounted within said housing and which slides longitudinal along said center shaft as commanded by the command signal to control a variable flow area within said housing through which the fluid flow passes to provide the regulated fluid flow, wherein the longitudinal movement of said piston assembly is directly controlled by pneumatic pressure in a first cavity exerting force on a first face of said piston, versus the pressure in a servo pressure cavity exerting force on a second fact of said piston;

an outlet flange assembly which connects to said housing and through which the regulated fluid flow exits said valve, wherein said outlet flange assembly includes a feedback orifice through which the regulated fluid pressure is fed back to said first cavity; and a vent orifice which vents said first cavity to ambient.

3. The pneumatically stabilized inline valve according to claim 2 wherein said housing and outlet flange assembly form a feedback passage through which the regulated fluid pressure passes from said feedback orifice to said first cavity.

4. A pneumatically stabilized inline valve responsive to a command signal and which provides a regulated fluid flow, said valve includes a housing having an inlet which receives a pressurized fluid, a housing longitudinal center shaft, and a housing outlet, and an annular piston assembly mounted within said housing which slides longitudinal along said housing center shaft as commanded by the command signal to control a variable flow area within said housing through which the fluid flow passes to provide the regulated fluid flow, the longitudinal movement of said piston assembly is directly controlled by pneumatic pressure in a first cavity exerting force on a first face of said piston, versus the pressure in a servo pressure cavity exerting force on a second face of said piston, and an outlet flange assembly connected to said housing outlet and through which the regulated fluid flow exits, the improvement characterized by:

a feedback orifice in said outlet flange assembly through which the regulated fluid pressure is fed back to said first cavity and a vent orifice in said housing which vents said first cavity to ambient wherein the amount of pressure feedback provided to said first cavity is controlled by the ratio of the diameters of said feedback orifice and said vent orifice.

* * * * *